(12) United States Patent
Hirano et al.

(10) Patent No.: US 8,816,978 B2
(45) Date of Patent: Aug. 26, 2014

(54) SEESAW TOUCHPAD WITH HORIZONTAL DIRECTION HINGE

(75) Inventors: Hiroki Hirano, Kanagawa-ken (JP); Tomoyuki Takahashi, Kanagawa-ken (JP); Aaron Michael Stewart, Raleigh, NC (US); Takeo Hyodoh, Kanagawa-ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 230 days.

(21) Appl. No.: 13/223,240

(22) Filed: Aug. 31, 2011

(65) Prior Publication Data
US 2013/0050099 A1    Feb. 28, 2013

(51) Int. Cl.
*G06F 3/041* (2006.01)
*G06F 1/16* (2006.01)
*G06F 3/0354* (2013.01)

(52) U.S. Cl.
CPC ............ *G06F 3/03547* (2013.01); *G06F 1/169* (2013.01); *G06F 2203/04105* (2013.01)
USPC ....................................................... 345/173

(58) Field of Classification Search
CPC .......................................... G06F 3/041–3/047
USPC ................................. 345/173–179
See application file for complete search history.

(56) References Cited

U.S. PATENT DOCUMENTS

| | | | |
|---|---|---|---|
| 6,135,886 A * | 10/2000 | Armstrong | 463/37 |
| 2006/0158435 A1 * | 7/2006 | Lin et al. | 345/168 |
| 2007/0052691 A1 * | 3/2007 | Zadesky et al. | 345/173 |
| 2011/0018816 A1 * | 1/2011 | Liu et al. | 345/173 |

FOREIGN PATENT DOCUMENTS

WO    WO2010/138288    2/2010

OTHER PUBLICATIONS

Synaptics, Inc., "ClickPad", http//www.synaptics.com/solutions/products/clickpad, 2004-2011, pp. 1-3.

* cited by examiner

*Primary Examiner* — Kevin M Nguyen
*Assistant Examiner* — Cory Almeida
(74) *Attorney, Agent, or Firm* — Shimokaji & Assoc., P.C.

(57) ABSTRACT

An input device and computing system is provided for a user to input data. An input device may comprise a touch sensitive pad and a hinge. The touchpad may have a touch sensitive surface. The touchpad may have a first end and a second end. The hinge may be disposed parallel to the first end and the second end. The touchpad may be pivotably connected to the hinge to allow displacement of the touchpad from a flat position to an activate position at the first end when a force is applied to the first end of the touch surface.

13 Claims, 4 Drawing Sheets

SEESAW TOUCHPAD WITH HORIZONTAL DIRECTION HINGE

BACKGROUND OF THE INVENTION

The present invention relates generally to methods and apparatus for data input and, more specifically, to methods and apparatus for data input to computers and other electronic instruments.

Pointing devices are common touch sensitive input devices for computers, laptops, cell phones, PDAs (personal digital assistants), and other electronic devices. Users may employ a pointing device, such as a mouse, trackball, track point, touchpad, or touch screen, to move a cursor on the screen to make selections.

Nestled between the G, H, and B keys on many laptop computers is a pointing stick. The pointing stick, often referred to as "the little red button", may be used for moving a mouse pointer with an index finger. A TrackPoint® device consists of the pointing stick and three buttons, which are situated at the center, below the space bar, and may be pushed with a thumb. The left button and right button may correspond to a left and right mouse button. When a user moves the pointing stick while pushing the center button below the space bar, a scroll function may be activated.

A typical touchpad consists of one touch sensor and two buttons that are situated below the touch sensor. Touchpads offer a promise of having a spatial correspondence to the surface of the computer screen, so as the finger moves around the touchpad, the cursor or pointer on the screen moves correspondingly to a new position.

In recent years, "click touchpad" or "click pad" technology has been developed which allows touchpads, touch screens, and other touch sensors to provide tactile feedback by being at least partially depressible or "clickable." The "click" may be purely tactile feedback or may be used to generate a signal that is used by the electronic system in which the click pad is installed.

Therefore, it can be seen that there is a continuing need for improvements in input devices, including those using click pad technology. In particular, there is a need for a better user experience with a simple looking and economical input device.

SUMMARY

In one aspect, an input device comprises a touchpad having a touch sensitive surface, wherein the touch sensitive surface has a first end and a second end; and a hinge disposed between the first end and the second end, wherein the touchpad is pivotably connected to the hinge to allow displacement of the touchpad from a flat position to an activate position at the first end when a force is applied to the first end of the touch surface.

In another aspect, an input device comprises a base plate; a touchpad having a touch sensitive surface; and a plurality of tension bars sandwiched between the base plate and the planar plate, wherein the tension bars biases the planar plate to a flat position.

In a further aspect, a computing system comprises a computing device capable of receiving, processing, and outputting data; and an input device adapted to send data to the computing device in order to perform an action in the computing device, wherein the input device comprises: a touchpad coupled to the computing device by a hinge and configured to generate touching signals; and a movement indicator configured to generate a button signal when the touchpad is depressed.

These and other features, aspects and advantages of the present invention will become better understood with reference to the following drawings, description and claims.

DETAILED DESCRIPTION OF EMBODIMENTS

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments may comprise an input device, such as a touchpad, for example, which may be used for various models or designs of electronic devices, such as a notebook PC, a smart phone, a cell phone, and a personal digital assistant, for example. More specifically, exemplary embodiments provide alternatives to an existing click pad by adding a hinge at a center of the touchpad. Exemplary embodiments optimize the user-friendliness of communications devices from a tactile input perspective. Additional input points and options enable complex applications of functions otherwise impractical for computing devices. In exemplary embodiments, the centered horizontal hinge may be used to support a touchpad, by eliminating buttons for convenience of multi-gesture input.

Exemplary embodiments may include a plurality of tension bars to resiliently support the touchpad in a flat position. Exemplary embodiments may further include a plurality of switches disposed under the touchpad. Through contact of an object, such as a user's finger, on the touchpad, the switches may be pressed to make contact with a base plate under the touchpad. When the object moves away from the touchpad, the tension bars may bias the touchpad back to the flat position. Two opposite ends of the touchpad may move up and down like a see-saw pivoted on the horizontal hinge. One end of the touchpad may be delineated into TrackPoint® button zones. Another end of the touchpad may be delineated into touchpad button zones. By using the combination of hinges, switches, and tension bars, exemplary embodiments may provide a user-friendly, economical, and simple-looking input device.

Figure 1:
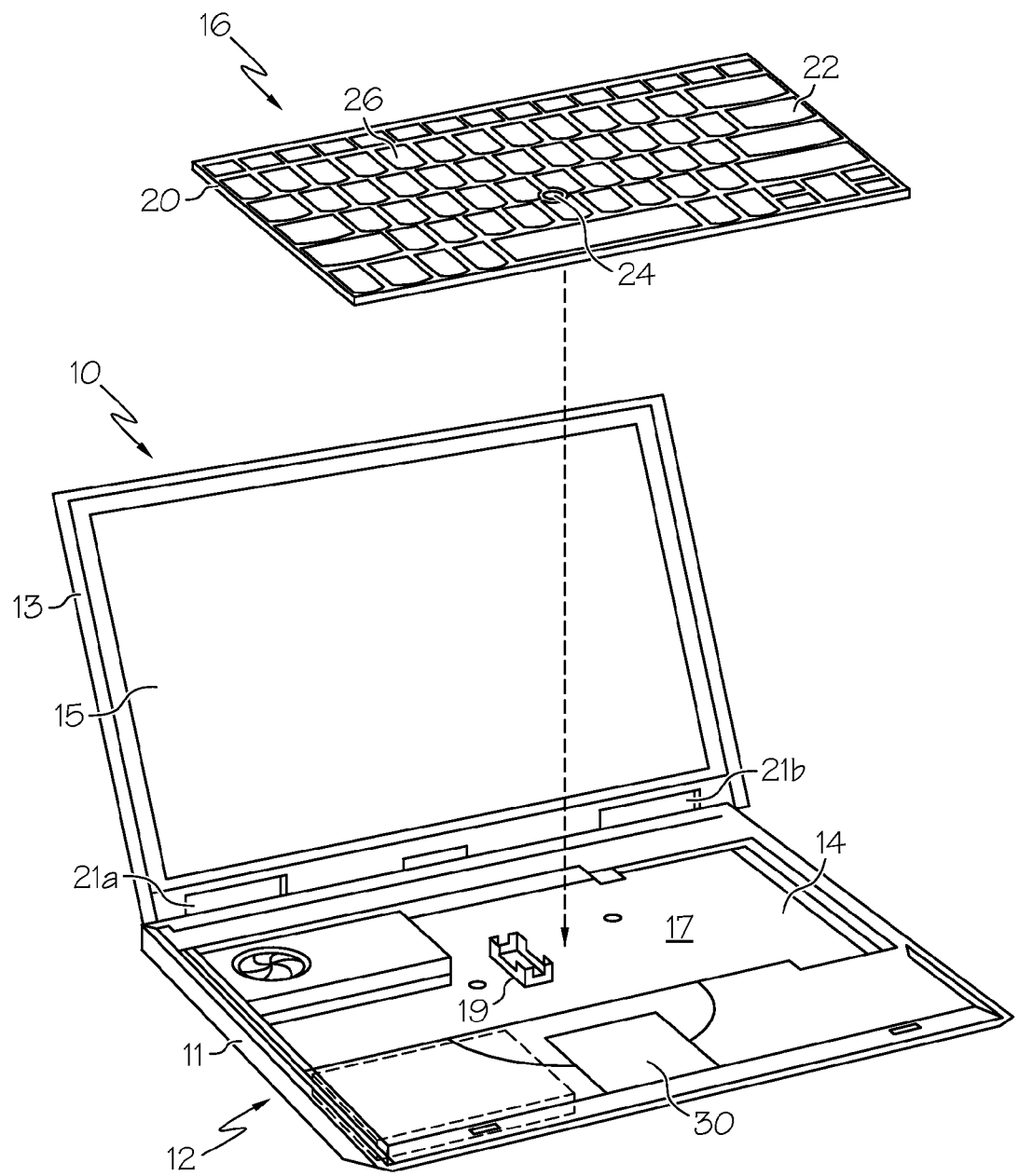
FIG. 1 is an exploded perspective view of an exemplary embodiment incorporated in a notebook PC.

FIG. 1 is an exploded perspective view of an exemplary embodiment of a computing system which is capable of receiving, processing, and outputting data, such as a notebook PC 10. The notebook PC 10 may be a laptop computer system, such as one of the ThinkPad® series of personal computers sold by Lenovo (US) Inc. of Morrisville, N.C., or a workstation computer, such as the ThinkStation®, which is sold by Lenovo (US) Inc. of Morrisville, N.C. The notebook PC 10 may have a liquid crystal display (LCD) 15 in a display casing 13. A bottom case 11 may have a bottom wall 12 and a recessed portion 14 opposing the bottom wall 12. The bottom case 11 may further accommodate system devices, such as a printed circuit board (PCB) 17. A keyboard unit 16 may be adapted for installation in the notebook PC 10. The keyboard unit 16 may be attached to the bottom case 11 so as to cover the recessed portion 14 of the bottom case 11. The bottom case 11 and the display casing 13 may be openably coupled to each other via hinge portions 21a and 21b.

Still referring to FIG. 1, the keyboard unit 16 may comprise a keyboard body 20 which may include a top face 22. The keyboard unit 16 may be electrically connected to a terminal part 19 of the printed circuit board 17.

The keyboard 16 may further include a pointing stick 24, which is used for moving a mouse pointer with an object, such as an index finger. The notebook PC 10 may further include an input device adapted to send data to the notebook PC 10 in order to perform an action in the notebook PC 10. The input device may be a flat touchpad 30, for example.

Figure 2A:
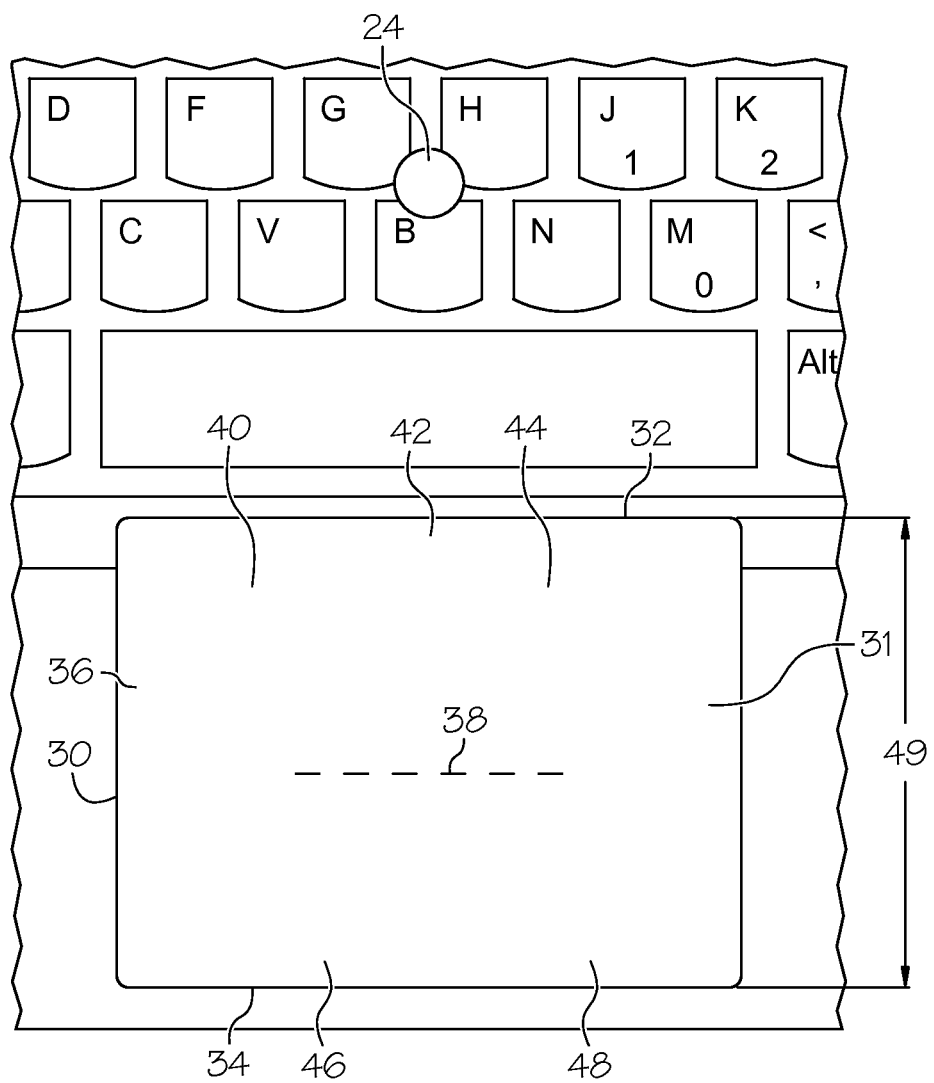
FIG. 2A is a plan view of an exemplary embodiment of a touchpad and a partial keyboard illustrating an exemplary position of a hinge.
Figure 2B:
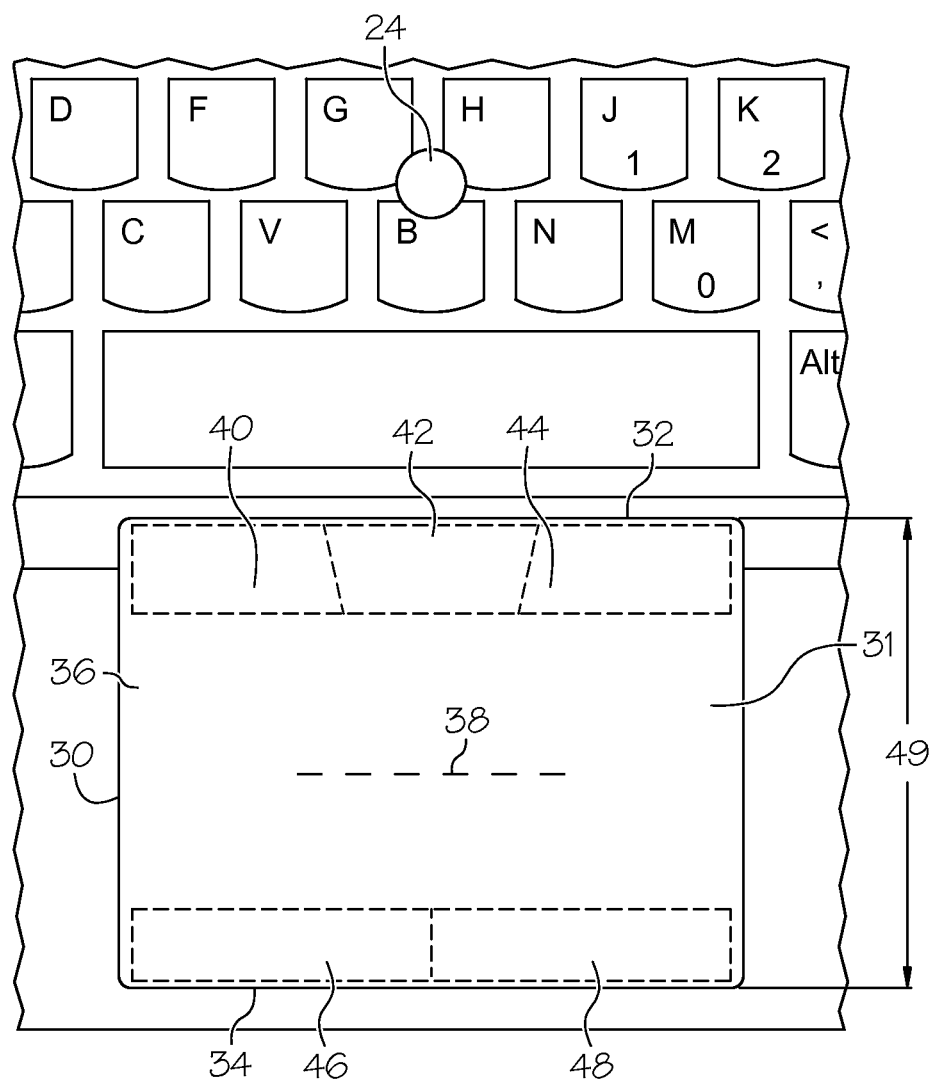
FIG. 2B is a plan view of an exemplary embodiment of a touchpad and a partial keyboard illustrating exemplary positions of button zones.
Figure 3A:
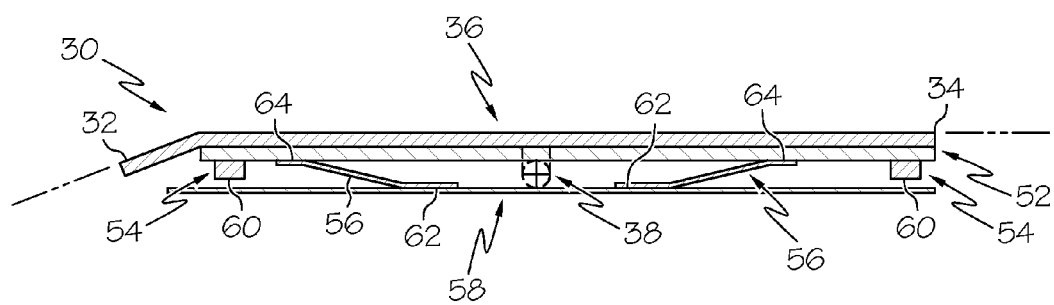
FIG. 3A is a side view of the exemplary embodiment of the touchpad as shown in FIG. 2.

Referring to FIG. 2A, a touchpad 30 may have a top cover 36 (also shown in FIG. 3A). The top cover 36 may have a touch sensor 31, which may be a conventional sensor to detect touch or contact to the touchpad 30. When an object on the touching surface of the touchpad 30 is moved, the touchpad may generate a touching signal. In one exemplary embodiment, the touch sensor 31 may be a single capacitive sensor (rather than multiple traces or cells per key). The touchpad 30 may be any type of touchpad, which are generally well known (e.g., capacitive, resistive, or electromagnetic touchpads). For example, touchpad 30 may be a capacitive touchpad, which may include typically a two-dimensional grid of intersecting conductive traces in the X and Y directions. When a finger or another object contacts the touchpad, the circuitry, which may be disposed on the printed circuit board (PCB) 17, may respond to the touch sensor 31 of the touchpad 30 and determine the touched position on the touchpad 30 by sensing a change in capacitance in both X and Y directions, for example.

The touchpad 30 may be connected to the notebook PC 10 by the hinge 38, which may be disposed in the bottom case 11. The hinge 38 may be parallel to a first end 32 or a second end 34 in such way that the hinge 38 may allow displacement of the touchpad 30 from a flat position to an activate position (to activate a button function) at the first end 32 when a force is applied to the first end 32 of the touch surface. The top cover 36 of the touchpad 30 may have touch sensitive surface.

One end of the top cover 36 may be delineated, for example, into three button zones, which includes a left button zone 40, a center button zone 42, and a right button zone 44. The other end of the top cover 36 may be delineated, for example, into two button zones, which include a left touchpad button zone 46, and a right touchpad button zone 48. By replacing physical buttons with button zones, an exemplary embodiment may create a depth 49 of the touchpad 30.

Referring to 2B, the button zones may represent regions of the touchpad that may be moved by a user to implement distinct button functions. The dotted lines represent areas of the touchpad 30 that make up an individual button zone. Any number of button zones may be used. For example, two, three, four, five, six, for example.

The touchpad 30, together with the pointing stick 24 may be useful for a variety of applications. The pointing stick 24, with the left button zone 40, the center button zone 42, and the right button zone 44, may enable cursor control, typically performed by a mouse. For example, the pointing stick 24 may be used for moving a mouse pointer with an index finger. The left button zone 40 may correspond to the left mouse button. The right button zone 44 may correspond to the right mouse button, with the center button zone 44 corresponding to a scroll wheel of the mouse button.

Other exemplary applications for such a combination of the pointing stick 24 and button zones may include vertical and horizontal scrolling, 3D rotation, document navigation, gaming applications, pressure sensitive input, and multi-degree of freedom input. Another application for use with the touchpad 30 may include computer control other than cursor control, such as finger-based gesture shortcuts for menu selections, e.g., drawing an "O" across the top cover 36 to do an "Open File" command or menu pick.

Referring to FIG. 3A, an exemplary embodiment of the touchpad 30 may further include a plurality of tension bars 56, with at least one tension bar being disposed at one side of the hinge 38 and another one at another side of the hinge 38. The tension bars 56 and the hinge 38 may be sandwiched between a planar plate 52 and a base plate 58. The tension bar 56 may have one end 62 fixed to the base plate 58 with another end 64 closely touching the planar plate 52. The end 64 of the tension bars 56 may make friction with the planar plate 52 when the top cover 36 above the planar plate 52 of the touchpad 30 is depressed by an object.

The touchpad 30 may further include a plurality of movement indicators. The movement indicators may be any combination of switches, such as mechanical switches 54, and sensors. Switches are generally configured to provide pulsed or binary data such as activate (on) or deactivate (off). By way of example, an underside portion of the touchpad 30 may be configured to contact or engage (and thus activate) a switch when the user presses on touchpad 30. The sensors, on the other hand, are generally configured to provide continuous or analog data. By way of example, the sensor may be configured to measure the position or the amount of tilt of touchpad 30 relative the bottom case 11 when a user presses on the touchpad 30. Any suitable mechanical, electrical or optical switch or sensor may be used. For example, tact switches, force sensitive resistors, pressure sensors, proximity sensors and the like may be used.

Figure 3B:
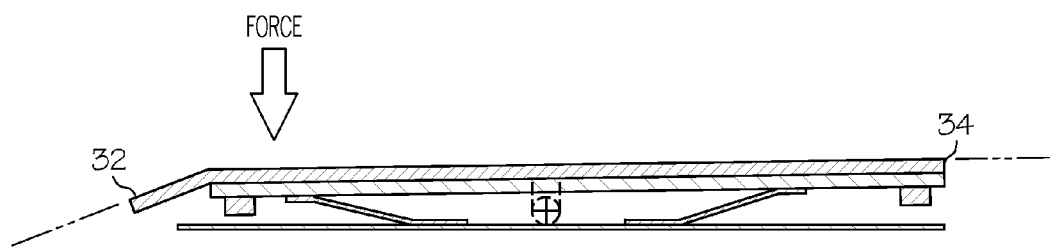
FIG. 3B is a side view of the exemplary embodiment of the touchpad when a user presses one end of the touchpad as shown in FIG. 2.

At least one switch 54 may be disposed at a center of the first end 32 of the touchpad 30, with another switch 54 disposed at a center of the second end 34 of the touchpad 30. When a force is pressed to the first end 32 of the touchpad 30, the first end 32 of the touchpad 30 may move downward from a flat position as shown in FIG. 3A to an activate position as shown in FIG. 3B, while the second end 34 of the touchpad 30 may move upwardly to a deactivate position. When the touchpad 30 is at the activate position, the switch may be depressed and touch the base plate 58 to generate a button signal.

The click actions may be generally arranged to actuate one or more switches 54. That is, a particular button zone moving from the flat or neutral position to a depressed position may be caused to actuate a switch 54. The switch 54 may be configured to sense movements of the button zones and touch positions from the touchpad 30 during the clicking action and send an activating signal (such as an "ON" signal, for example) and signals corresponding to the movements to the electronic device. After receiving the activating signal, the electronic device may check the touch position. If the touch position corresponds to a left button zone 40, for example, the electronic device may make an event corresponding to the left button zone click.

As should be appreciated, the button functions generated by press on each button zone may include selecting an item on the screen, opening a file or document, executing instructions, starting a program, viewing a menu, and/or the like. The button functions may also include functions that make it easier to navigate through the electronic system, for example, zoom, scroll, open different menus, home the input pointer, perform keyboard related actions such as enter, delete, insert, page up/down, and the like.

When an object, such as a finger, for example, moves away from the top cover 36, the tension bar 56 biases the first end 32 of the touchpad 30 back to the flat position.

Similarly, when a force is applied to the second end 34 of the touchpad 30, the second end 34 of the touchpad 30 may move downward from the flat position as shown in FIG. 3A to an activate position while the first end 34 of the touchpad 30 moves upwardly to an up position. When the object moves away from the top cover 36, the tension bar 56 biases the second end 34 of the touchpad back to the flat position. A distance between the bottom end 60 of the switch 54 to the base plate 58, which may refer to the distance between the flat position and the activate position of the touchpad 30, may be adjustable.

It should be understood, of course, that the foregoing relate to exemplary embodiments of the invention and that modifications may be made without departing from the spirit and scope of the invention as set forth in the following claims.

We claim:

1. An input device, comprising:
a touchpad having a touch sensitive surface, the touch sensitive surface including a first end having a first end first button zone and a first end second button zone, and a second end;
a base plate;
a hinge disposed between the first end and the second end, wherein the touchpad is pivotably connected to the hinge to allow displacement of the touchpad from a flat position to a first activate position wherein the first end is pivoted towards the base plate and the second end is pivoted away from the base plate; and
a movement indicator, the movement indicator configured to continuously generate a movement signal indicative of the touchpad displacement around the hinge; and
wherein the touchpad is configured to generate touching signals indicative of the location of touches on the touch sensitive surface;
wherein the touchpad is configured to generate a first function signal when the movement signal indicates the touchpad is in the first activate position, and the touching signals indicate a simultaneous touch of the touch sensitive surface in the first end first button zone; and
wherein the touchpad is configured to generate a second function signal, the second function signal different than the first function signal, when the movement signal indicates the touchpad is in the first activate position, and the touching signals indicate a simultaneous touch of the touch sensitive surface in the first end second button zone.

2. The input device of claim 1 further comprising a plurality of tension bars which bias the touchpad toward the flat position from the first activate position.

3. The input device of claim 2, wherein:
the second end has at least one second end button;
the touchpad is pivotably connected to the hinge to allow displacement of the touchpad from a flat position to a second activate position wherein the second end is pivoted towards the base plate and the first end is pivoted away from the base plate; and
the touchpad is configured to generate a third function signal when the movement signal indicates the touchpad is in the second activate position, and the touch signal indicates a simultaneous touch of the touch sensitive surface in any of the at least one second end button zones.

4. The input device of claim 1, wherein the hinge is parallel to the first end or the second end.

5. The input device of claim 1, wherein the first end first button zone is configured to correspond to a first mouse button, and the first end second button zone is configured to correspond to a second mouse button.

6. An input device, comprising:
a base plate including a switch;
a hinge; and
a touchpad having a touch sensitive surface including a first a button zone and a second button zone integrated into the touch sensitive surface, the touchpad pivotably connected to the hinge to allow displacement of the touchpad from a flat position to a position activating the switch, the touchpad configured to generate a touching signal indicative of the location of a touch on the touch sensitive surface; and
wherein the touchpad is configured to generate a first function signal when the switch is activated, and the touch signal indicates a simultaneous touch of the touch sensitive surface in the first button zone; and
wherein the touchpad is configured to generate a second function signal, the second function signal different than the first function signal, when the switch is activated, and the touch signal indicates a simultaneous touch of the touch sensitive surface in the second button zone.

7. The input device of claim 6 further comprising
a plurality of tension bars sandwiched between the base plate and the touchpad, the tension bars biasing the touchpad to a flat position; and
wherein the hinge is disposed between the tension bars, and sandwiched between the base plate and the touchpad, and
wherein the touchpad includes a first end and a second end, and the first end is configured to pivot around the hinge towards the base plate and activate the switch when a force is applied to the second end of the touch sensitive surface.

8. The input device of claim 6, wherein the touchpad is configured to accept a menu selection by a gesture across the touchpad.

9. A computing system, comprising:
a computing device capable of receiving, processing, and outputting data;
a keyboard adapted to send data to the computing device; and
an input device adapted to send data to the computing device in order to perform an action in the computing device, wherein the input device comprises:
a touchpad including a touch sensitive surface, the touchpad pivotably coupled to the computing device by a hinge and configured to generate touching signals indicative of the location of touches on the touch sensitive surface, the touchpad configured to accept a menu selection by a gesture across the touch sensitive surface;

- a first button zone integrated onto a first end of the touch sensitive surface corresponding to a first mouse button;
- a second button zone integrated onto a second end of the touch sensitive surface, corresponding to a second mouse button, the second end being on an opposite side of the hinge from the first end; and
- a movement indicator configured to generate a button signal indicating activation of either the first button zone or the second button zone and activation of an operating function corresponding to either the first button zone or the second button zone in response to the touchpad being depressed at either the first end or the second end, wherein the movement indicator is a sensor to measure touchpad movement continuously.

10. The computing system of claim 9 further comprising a plurality of tension bars connected to the touchpad to bias the touchpad to a flat position.

11. The computing system of claim 9, wherein the button zones are configured to provide operating signals in conjunction with use of a pointing stick coupled to the computing device.

12. The computing system of claim 9, wherein the touchpad is pivotably connected to the hinge to allow the first or the second end of the touchpad to be in an activate position or deactivate position.

13. The computing system of claim 12 wherein the hinge is parallel to the either end of the touchpad which are capable of moving to be in the activate position or deactivate position.

* * * * *